United States Patent
Kaji

(10) Patent No.: US 10,195,909 B2
(45) Date of Patent: Feb. 5, 2019

(54) PNEUMATIC TIRE

(71) Applicant: Toyo Tire & Rubber Co., Ltd., Osaka-shi, Osaka (JP)

(72) Inventor: Shinichi Kaji, Osaka (JP)

(73) Assignee: TOYO TIRE & RUBBER CO., LTD., Itami-shi (JP)

(*) Notice: Subject to any disclaimer, the term of this patent is extended or adjusted under 35 U.S.C. 154(b) by 397 days.

(21) Appl. No.: 14/541,951

(22) Filed: Nov. 14, 2014

(65) Prior Publication Data
US 2015/0158340 A1 Jun. 11, 2015

(30) Foreign Application Priority Data

Dec. 6, 2013 (JP) ................................. 2013-253278

(51) Int. Cl.
B60C 11/13 (2006.01)
B60C 11/04 (2006.01)

(52) U.S. Cl.
CPC ........ B60C 11/1307 (2013.01); B60C 11/047 (2013.01); B60C 2011/1338 (2013.01)

(58) Field of Classification Search
CPC .................... B60C 11/1307; B60C 2011/1338
See application file for complete search history.

(56) References Cited

U.S. PATENT DOCUMENTS

| | | | | |
|---|---|---|---|---|
| 2,056,131 A | * | 9/1936 | Brittain | B60C 11/0309 152/209.21 |
| 2,869,609 A | * | 1/1959 | Balzhiser | B60C 11/0309 152/209.21 |
| 3,095,024 A | * | 6/1963 | Robertson | B60C 11/0309 152/209.21 |
| 2009/0301622 A1 | * | 12/2009 | Brown | B60C 11/0306 152/209.19 |
| 2010/0258228 A1 | * | 10/2010 | De Benedittis | B60C 11/13 152/209.21 |
| 2011/0126952 A1 | * | 6/2011 | Nakamizo | B60C 11/0309 152/209.21 |

(Continued)

FOREIGN PATENT DOCUMENTS

| | | |
|---|---|---|
| CN | 101903195 A | 12/2010 |
| DE | 6808449 U * | 5/1969 |

(Continued)

OTHER PUBLICATIONS

Machine translation for Korea 2011-001 0937 (no date).*

(Continued)

*Primary Examiner* — Steven D Maki
(74) *Attorney, Agent, or Firm* — Westerman, Hattori, Daniels & Adrian

(57) ABSTRACT

Provided is a pneumatic tire where a main groove extending in a tire circumferential direction and a projection projecting toward the inside of the main groove from a groove side wall of the main groove are formed on a tread portion, wherein a projecting amount of the projection from the groove side wall is decreased as the projection extends to a groove bottom of the main groove, the projection terminates at a position outside the groove bottom in a tire radial direction, and a length of the projection along the tire circumferential direction is shortened as the projection extends to a distal end side of the projection in a projecting direction.

12 Claims, 14 Drawing Sheets

(56) References Cited

U.S. PATENT DOCUMENTS

2011/0277897 A1\* 11/2011 Yokomakura ....... B60C 11/0309
152/209.18

FOREIGN PATENT DOCUMENTS

| EP | 1 946 943 A1 | | 7/2008 |
|---|---|---|---|
| JP | 60-92904 | | 5/1985 |
| JP | 04-183609 A | | 6/1992 |
| JP | 2002-370510 A | | 12/2002 |
| JP | 2006-111088 A | \* | 4/2006 |
| JP | 2006-111088 A | | 4/2006 |
| JP | 2007-210568 A | | 8/2007 |
| JP | 2008-174198 A | | 7/2008 |
| JP | 2011-143900 A | | 7/2011 |
| JP | 2013-147115 A | \* | 8/2013 |
| KR | 2011-0010937 U | \* | 11/2011 |

OTHER PUBLICATIONS

Machine translation for Japan 2006-111088 (no date).\*
Machine translation for Germany 6808449 (no date).\*
Machine translation for Japan 2013-147115 (Year: 2017).\*
Office Action dated Oct. 10, 2016, issued in Chinese Application No. 201410646120.9, with English translation (15 pages).
Office Action dated May 31, 2016, issued in counterpart Chinese Patent Application No. 201410646120.9, with abriged translation. (13 pages).
Office Action dated May 9, 2017, issued in counterpart Japanese Patent Application No. 2013-253278, with English translation. (8 pages).
Office Action dated Jan. 18, 2017, issued in counterpart Chinese Patent Application No. 201410646120.9, with English translation. (11 pages).

\* cited by examiner

PNEUMATIC TIRE

BACKGROUND OF THE INVENTION

Field of the Invention

The present invention relates to a pneumatic tire where main grooves extending along the tire circumferential direction are formed in a tread portion.

Background Art

When a vehicle travels on pebbles road or the like, there may arise so-called pebble biting which is a phenomenon that pebbles on a road is bitten in a main groove formed in a tread potion of a tire. When the vehicle continues traveling in such a state where pebble biting occurs and the tire rolls, the pebble bitten in the main groove presses a groove bottom or a force which intends to widen the main groove by pushing acts on the groove bottom and hence, the damage such as cracks is liable to occur in the groove bottom.

In view of the above, conventionally, a pneumatic tire where projections are formed on a groove bottom or groove side walls of a main groove thus preventing pebble biting by such projections has been proposed in JP-A-2007-210568, JP-A-2002-370510 and JP-A-4-183609.

Although the above-mentioned tire can suppress the occurrence of pebble biting in the vicinity of the groove bottom, the tire has a drawback that the biting of pebbles in the vicinity of an opening end of the main groove cannot be prevented. It may be possible to increase a projecting height of the projections from the groove bottom. In this case, however, the rigidity of the projection is lowered. Accordingly, there arises a drawback that the biting of pebbles into the groove cannot be prevented or a volume of the groove is decreased and hence, traveling performance of the tire on a wet road surface (wet performance) is lowered.

Further, in the above-mentioned tire, the projection formed in the main groove is present on the groove bottom and hence, the projection has a shape where the projection is raised steeply from the groove bottom and hence, a gentle curved shape cannot be imparted to a boundary portion between the groove bottom and the projection. Accordingly, there arises a drawback that a crack is liable to occur from a root portion of the projection (the boundary portion between the groove bottom and the projection) which constitutes a crack starting point.

SUMMARY OF THE INVENTION

The invention has been made in view of the above-mentioned drawbacks, and it is an object of the invention to provide a pneumatic tire which can prevent the biting of pebbles in the vicinity of an opening end of a main groove while suppressing lowering of wet performance of the tire, and also can suppress the occurrence of cracks from a root portion of a projection which constitutes a crack starting point.

According to one aspect of the invention, there is provided a pneumatic tire where a main groove extending in a tire circumferential direction and a projection projecting toward the inside of the main groove from a groove side wall of the main groove are formed on a tread portion, wherein a projecting amount of the projection from the groove side wall is decreased as the projection extends to a groove bottom of the main groove, the projection terminates at a position outside the groove bottom in a tire radial direction, and a length of the projection along the tire circumferential direction is shortened as the projection extends to a distal end side of the projection in a projecting direction.

As a preferred mode of the pneumatic tire according to the invention, a projecting side surface of the projection facing in the tire circumferential direction may be indented inwardly. In such a case, it is preferable that the projecting side surface is formed into an arcuate curved shape in cross section. Further, in the pneumatic tire of the invention, a length of the projection along the tire circumferential direction may be shortened as the projection extends to the groove bottom of the main groove. A projecting outer surface of the projection facing an outside in a tire radial direction may be inclined toward a groove bottom side as the projection extends to a distal end side of the projection in a projecting direction. A projecting outer surface of the projection facing the outside in the tire radial direction may be positioned on a groove bottom side with respect to a ground contact surface of the tread portion. The projection may be alternately formed on a pair of groove side walls facing each other in an opposed manner in the main groove along the tire circumferential direction.

DETAILED DESCRIPTION OF THE INVENTION

First Embodiment

Figure 1:
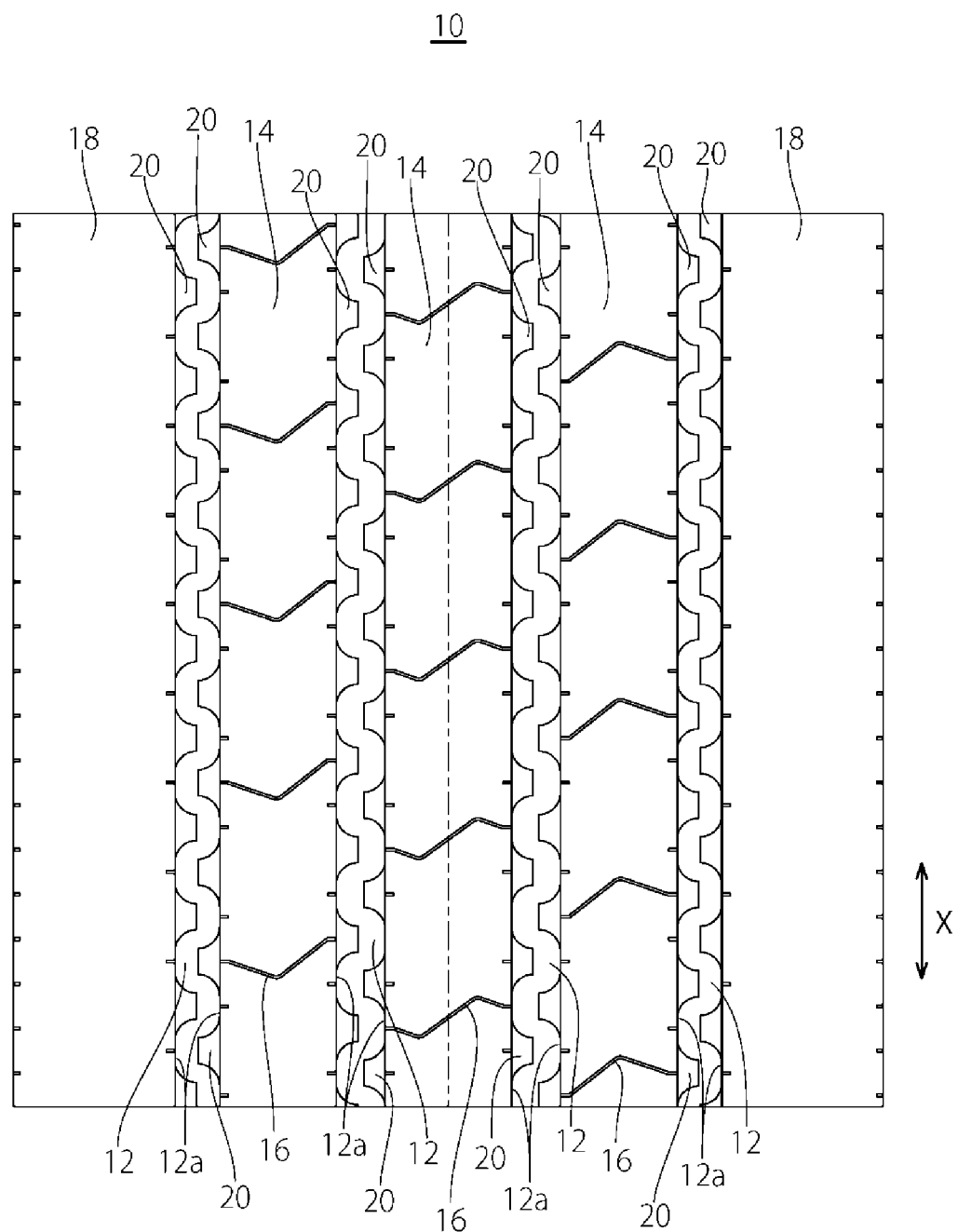
FIG. 1 is a developed view showing a tread pattern of a pneumatic tire according to a first embodiment of the invention.

Hereinafter, a first embodiment of the invention is explained by reference to drawings.

Although not shown in the drawing, a pneumatic tire of this embodiment includes: a pair of left and right bead portions and a pair of left and right side wall portions; and a tread portion 10 which is provided between both side wall portions such that the tread portion 10 connects radially outer end portions of the left and right side wall portions to each other. The pneumatic tire includes a carcass which extends between the pair of bead portions.

The carcass is formed of at least one carcass ply which extends to the bead portions from the tread portion 10 via the side wall portions, and has both end portions thereof engaged with bead cores which are embedded in the bead portions respectively. The carcass is provided for reinforcing the above-mentioned respective parts.

A belt formed of a steel cord layer covered with two or more rubber layers is provided to an outer peripheral side of the carcass in the tread portion 10. The belt reinforces the tread portion 10 on an outer periphery of the carcass.

On a surface of the tread portion 10 which constitutes a ground contact surface 11 of the pneumatic tire, as shown in FIG. 1, main grooves 12 which extend along the tire circumferential direction X are formed. In this embodiment, on the surface of tread portion 10, four main grooves 12 which extend straight in the tire circumferential direction, lateral grooves 16 which divide a land portion between the neighboring main grooves 12 into blocks 14, and shoulder ribs 18 which extend continuously in the tire circumferential direction outside the main grooves 12 positioned on both outermost sides in the tire width direction respectively.

Figure 2:
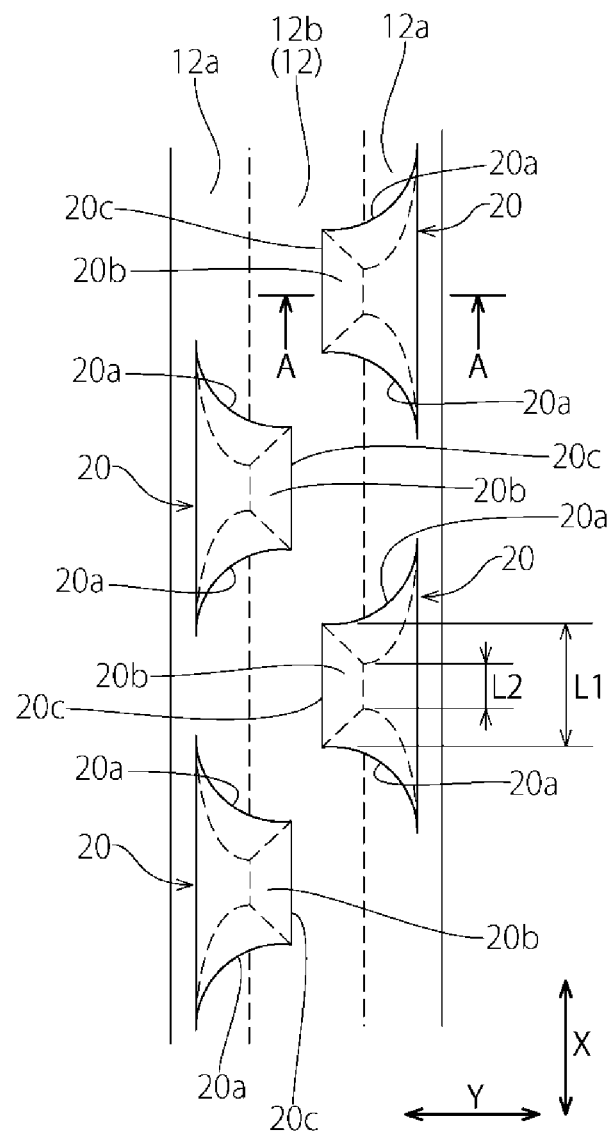
FIG. 2 is an enlarged view of an essential part in FIG. 1.

As shown in FIG. 1 and FIG. 2, on a pair of groove side walls 12a which defines the main groove 12, a plurality of projections 20 which project toward the groove side wall 12a facing each other and toward the inside of the main groove 12 are formed at intervals in the tire circumferential direction X. In this embodiment, the projections 20 are alternately formed on the pair of groove side walls 12a facing each other in an opposed manner along the tire circumferential direction X with the main groove 12 interposed therebetween.

Figure 3:
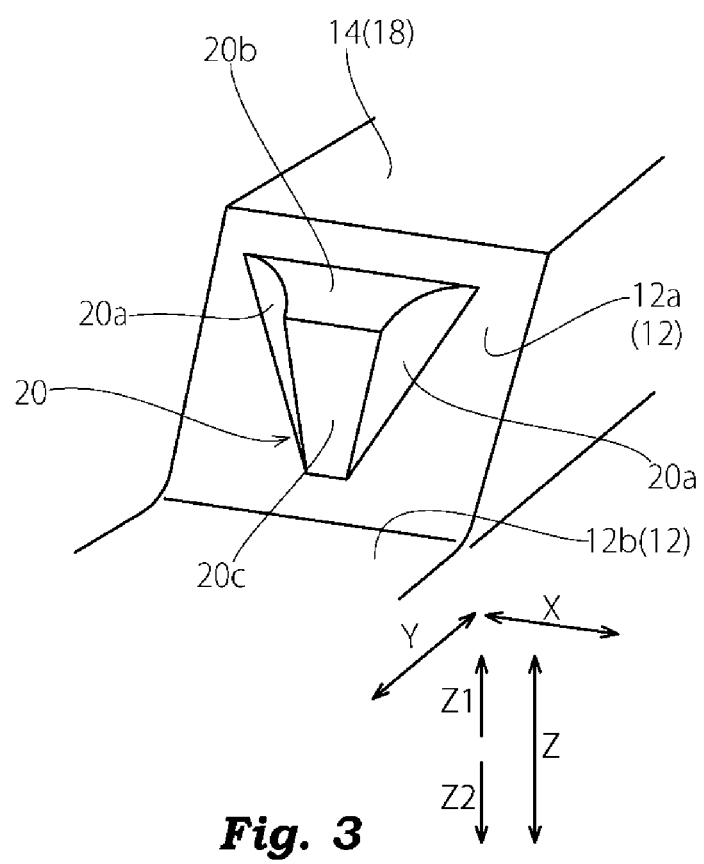
FIG. 3 is a perspective view of a projection formed in a main groove of the pneumatic tire shown in FIG. 1.
Figure 4:
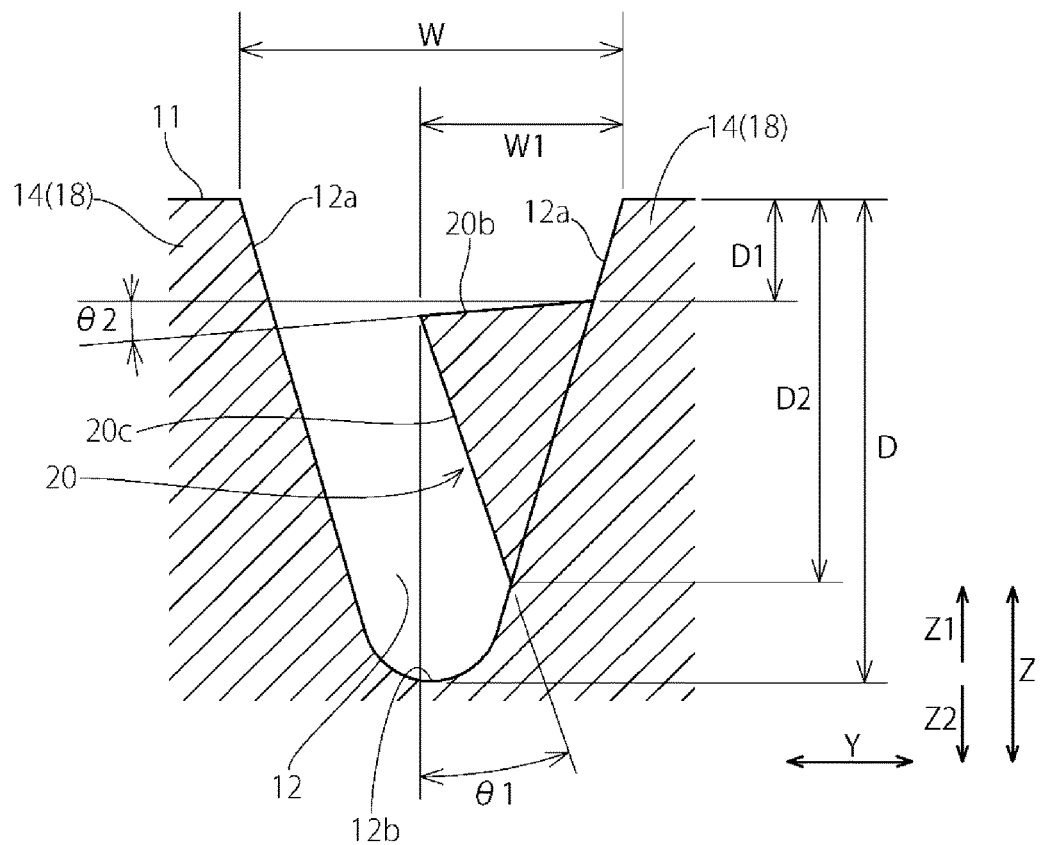
FIG. 4 is a cross-sectional view taken along a line A-A in FIG. 2.
Figure 5:
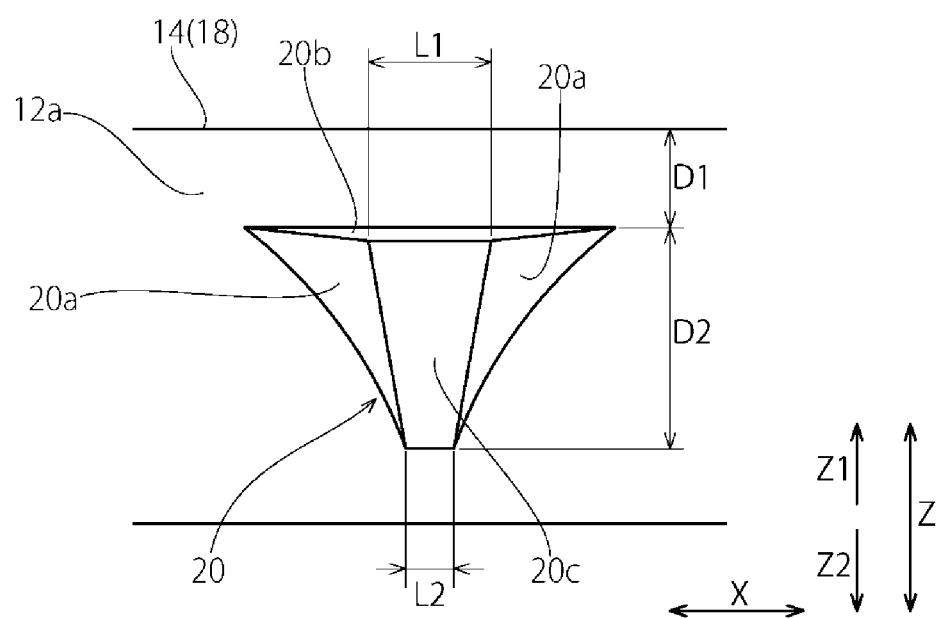
FIG. 5 is a front view of the projection formed on the main groove of the pneumatic tire shown in FIG. 1.

All of the plurality of projections 20 formed on the groove side walls 12a of the main groove 12 have the same shape. As shown in FIG. 3 to FIG. 5, the projection 20 has: a pair of projection side surfaces 20a which is directed in the tire circumferential direction X; a projection outer surface 20b which is directed in the tire radially outward direction Z1; and a projection front surface 20c which faces the groove side wall 12a in an opposed manner with the main groove 12 interposed therebetween.

To be more specific, the projection front surface 20c is inclined such that the projection front surface 20c approaches the groove side wall 12a as the projection front surface 20c extends to a groove bottom 12b in the tire radial direction Z which corresponds to the depth direction of the main groove 12. Due to such a structure, a projecting amount of the projection 20 from the groove side wall 12a is decreased as the projection 20 extends to the groove bottom 12b of the main groove 12, and the projection 20 terminates at a position in the tire radially outward direction Z1 with respect to the groove bottom 12b (that is, before the projection 20 reaches the groove bottom 12b). Further, the projection 20 has a tapered shape where a length of the projection 20 along the tire circumferential direction X is shortened as the projection 20 extends to a distal end side thereof in the projecting direction Y which corresponds to the width direction of the main groove 12 (that is, as the projection 20 is away from the groove side wall 12a). In this embodiment, the pair of projection side surfaces 20a is formed of an arcuate curved shape in cross section where the projection side surface 20a is curved so as to be indented toward the inside of the projection 20 (see FIG. 2 and FIG. 3).

The projection front surface 20c of the projection 20 has a shape which is tapered toward the groove bottom 12b such that a length of the projection front surface 20c along the tire circumferential direction X is shortened as the projection front surface 20c extends to the groove bottom 12b. A length L1 of the projection front surface 20c in the tire radially outward direction Z1 is larger than a length L2 of the projection front surface 20c in the tire radially inward direction Z2 (see FIG. 2 and FIG. 5).

In this embodiment, as shown in FIG. 4, a joining portion between the projection outer surface 20b and the groove side wall 12a is disposed at a position displaced toward the groove bottom 12b side from the ground contact surface 11 by a distance D1. Further, when the tire is in a 10 ground non-contact state as shown in FIG. 4, the projection outer surface 20b is inclined more toward the groove bottom 12b side as the projection outer surface 20b extends to a distal end side of the projection 20 in the projecting direction Y.

One example of various sizes of respective portions of the pneumatic tire of this embodiment is exemplified by reference to FIG. 2, FIG. 4 and FIG. 5. Assume that a repeat pitch length of the tread pattern is 50 mm, a groove width W of the main groove 12 on an opening side (ground contact surface 11 side) is 11 mm, and a depth D of the main groove 12 is 14 mm. In such a case, a length (projecting amount) W1 from a joining position between the projection outer surface 20b and the groove side wall 12a to the distal end of the projection outer surface 20b in the projecting direction Y can be set to 35% or more of the groove width W (length W1=5 mm, for example). The length L1 of the projection front surface 20c along the tire circumferential direction X in the tire radially outward direction Z1 (in other words, on the distal end side of the projection outer surface 20b in the projecting direction Y) can be set to a value which falls within a range from 4 mm to 10 mm (L1=7 mm, for example). The length L2 of the projection front surface 20c along the tire circumferential direction X in the tire radially inward direction Z2 can be set to 3 mm. The length D1 from the ground contact surface 11 to the projection outer surface 20b along the tire radial direction Z can be set to 2 mm. A length D2 from the ground contact surface 11 to the projection front surface 20c in the tire radially inward direction Z2 (in other words, a joining position between the projection front surface 20c and the groove side wall 12a) along the tire radial direction Z can be set to 11 mm. An angle $\theta 1$ of the projection front surface 20c with respect to the tire radial direction Z can be set to 20°, and an angle $\theta 2$ of the projection outer surface 20b with respect to the projecting direction Y of the projection 20 can be set to 2°.

In the pneumatic tire of this embodiment having such a constitution, with respect to the projection 20 which prevents the biting of pebbles into the main groove 12, a projecting amount of the projection 20 from the groove side wall 12a is decreased as the projection 20 extends to the groove bottom 12b of the main groove 12, and the projection 20 terminates at the position away from the groove bottom 12 in the tire radially outward direction Z1, and the projection 20 is not present on the groove bottom 12b. Due to such a constitution, the groove bottom 12b can be formed into a gentle curved shape so that the occurrence of cracks can be suppressed and, at the same time, a sufficient volume of the main groove 12 can be ensured. Accordingly, the lowering of wet performance can be suppressed.

Particularly, in this embodiment, the decrease of the volume of the main groove 12 on a groove bottom 12b side can be suppressed. Accordingly, in the case where the tire is worn so that wet performance is liable to be lowered, a sufficient volume of the groove can be ensured even when the projections 20 are formed on the main groove 12 and hence, the occurrence of pebble biting can be prevented by the projections 20 without lowering wet performance.

Further, in the pneumatic tire of this embodiment, the projection 20 which projects from the groove side wall 12a of the main groove 12 has a tapered shape where the length of the projection 20 along the tire circumferential direction X is shortened as the projection 20 extends to a distal end side thereof in the projecting direction Y. Accordingly, by joining the projection 20 and the groove side wall 12a of the main groove 12 to each other at a gentle angle, a stress concentration on the joining portion between the projection 20 and the groove side wall 12a of the main groove 12 can be alleviated and hence, it is possible to prevent the occurrence of cracks which start from the joining portion which constitutes a crack starting point.

In this embodiment, the projection side surfaces 20a which constitute the joining portion between the projection 20 and the groove side wall 12a have an arcuate curved shape in cross section which is curved so as to be indented toward the inside of the projection 20 and hence, the joining portion between the projection 20 and the groove side wall 12a of the main groove 12 can be formed into a gentle curved surface. Accordingly, it is possible to suppress the occurrence of cracks which start from the joining portion between the projection 20 and the groove side wall 12a which constitutes a crack starting point more effectively.

Figure 6A:
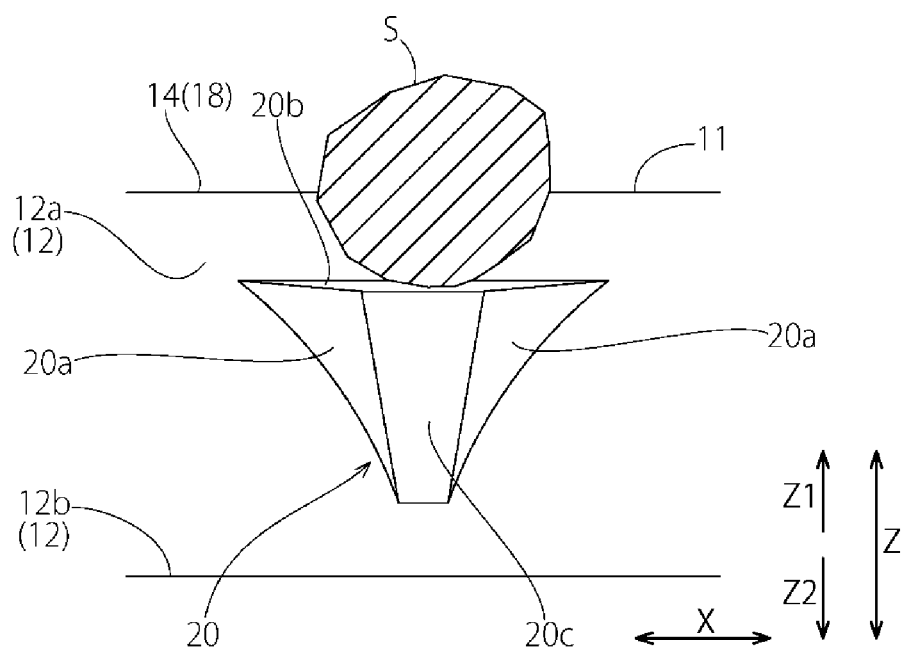
FIG. 6A is a front view of the projection showing a mechanism of discharging pebbles bitten in the main groove.
Figure 6B:
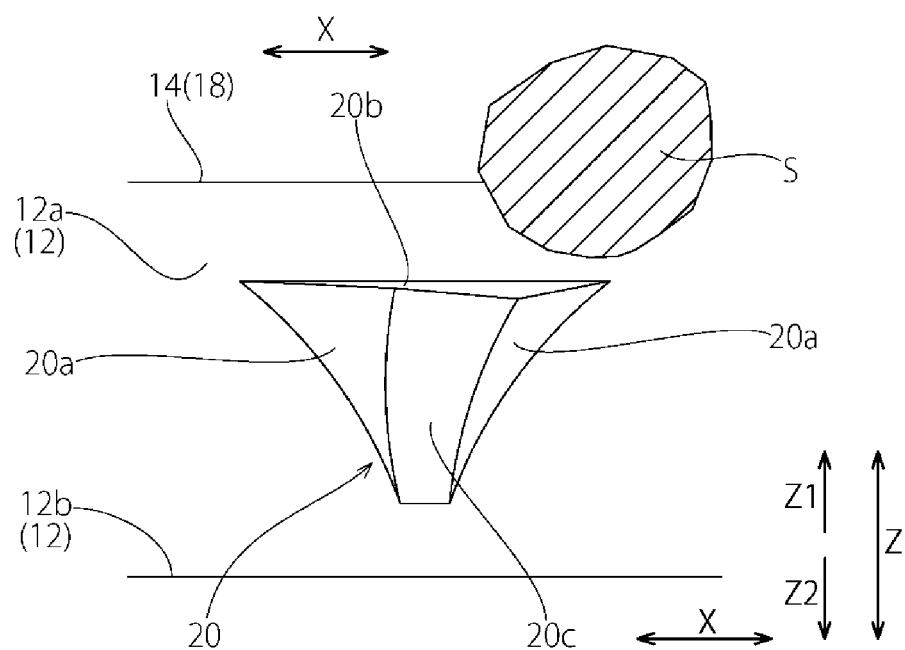
FIG. 6B is a front view of the projection showing a mechanism of discharging pebbles bitten in the main groove.

In this embodiment, the projection 20 formed on the main groove 12 has a tapered shape toward the groove bottom 12b where the length of the projection 20 along the tire circumferential direction X is shortened as the projection 20 extends to the groove bottom 12b and hence, the rigidity of the projection 20 on a groove bottom 12b side is low compared with the rigidity of the projection 20 on a ground contact surface 11 side. Accordingly, even when a pebble S is bitten between the groove side walls 12a of the main groove 12, as shown in FIG. 6A, the further biting of the pebble S into the groove bottom 12b side can be prevented by the projection outer surface 20b of the projection 20. Further, the rigidity of the projection 20 on a groove bottom 12b side is set to a low value so that, as shown in FIG. 6B, the torsional deformation of the projection 20 can be easily generated in the tire circumferential direction X. Accordingly, the pebble S bitten in the tire radially outward direction Z1 of the projection 20 can be moved and hence, the bitten pebble S can be discharged to the outside of the main groove 12 due to a centrifugal force or the like generated when the tire rolls.

Figure 7:
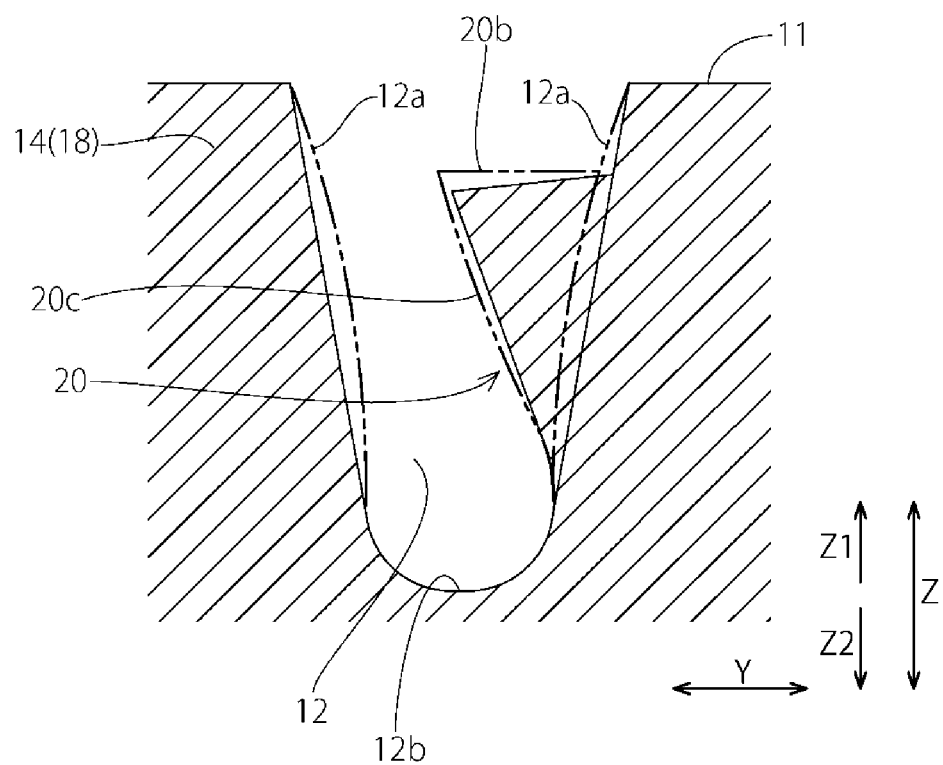
FIG. 7 is a cross-sectional view of the pneumatic tire in a ground contact state taken along a line A-A in FIG. 2.

In this embodiment, the projection outer surface 20b of the projection 20 is inclined toward the groove bottom 12b side as the projection outer surface 20b extends to the distal end side of the projection 20 in the projecting direction Y when the tire is in a ground non-contact state. Accordingly, when the tire is in a ground contact state, as indicated by a double-dashed chain line in FIG. 7, the main groove 12 and the projection 20 of the tread portion 10 are elastically deformed such that the projection outer surface 20b of the projection 20 becomes approximately parallel to the ground contact surface 11 and hence, the biting of pebbles into the main groove 12 can be effectively prevented.

In the pneumatic tire of this embodiment, the projection outer surface 20b of the projection 20 is positioned on the groove bottom 12b side than a ground contact surface 11 side of the tread portion 10 so that the projection 20 is positioned on the groove bottom 12b side away from the ground contact surface 11. Accordingly, at an initial stage of wearing of the tire where an amount of wear is liable to be unstable, there is no possibility that the projection 20 is brought into contact with a ground and hence, a ground contact pressure can be made uniform whereby a non-uniform wear of the tire can be suppressed.

In this embodiment, the projections 20 are alternately formed on the pair of groove side walls 12a which face each other in an opposed manner with the main groove 12 interposed therebetween along the tire circumferential direction X. Accordingly, even when a projecting amount of the projection 20 is set large, there is no possibility that the projection 20 formed on one of the pair of groove side walls 12a is brought into contact with the projection 20 formed on the other of the pair of groove walls 12a. Accordingly, it is possible to prevent the biting of pebbles by setting a projecting amount of the projection 20 large. Further, it is possible to suppress the generation of a non-uniform wear of the tire due to a non-uniform ground contact pressure which may be caused when the projections 20 which face each other in an opposed manner are brought into contact with each other.

The pneumatic tire of the invention exhibits excellent pebble discharge property as described above and hence, the pneumatic tire of the invention is particularly usefully applicable as a pneumatic tire for heavy load which is used for a vehicle having a relatively large vehicle total weight such as a truck or a bus which has many opportunities to travel on an unpaved road. However, the pneumatic tire of the invention is also applicable as various tires such as a tire for passenger car.

Another Embodiment

Figure 8A:
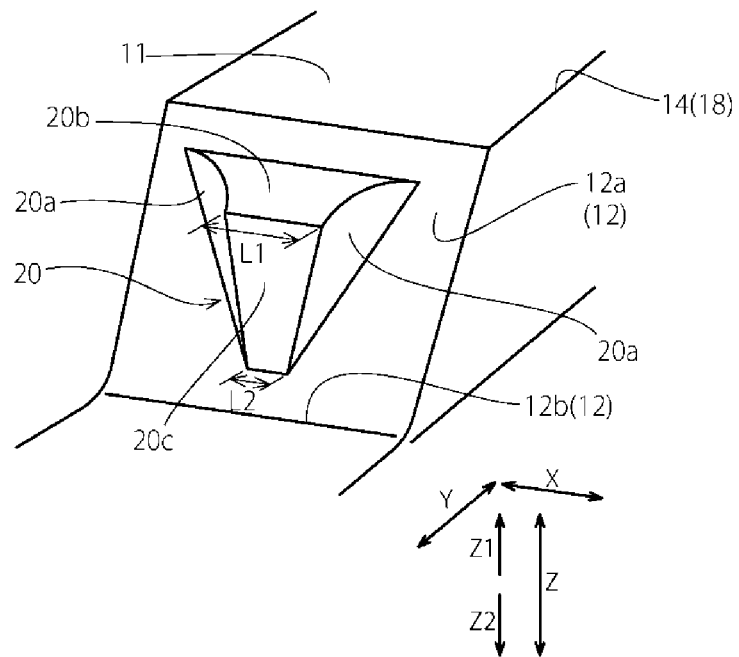
FIG. 8A is a perspective view of a projection formed on a main groove of a pneumatic tire according to a modification 1 of the invention.
Figure 8B:
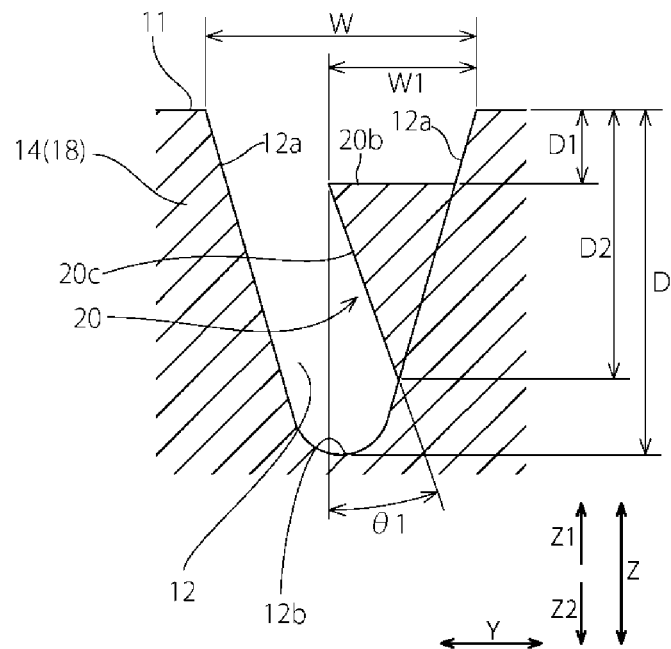
FIG. 8B is a cross-sectional view of the projection formed on the main groove of the pneumatic tire according to the modification 1 of the invention.
Figure 9A:
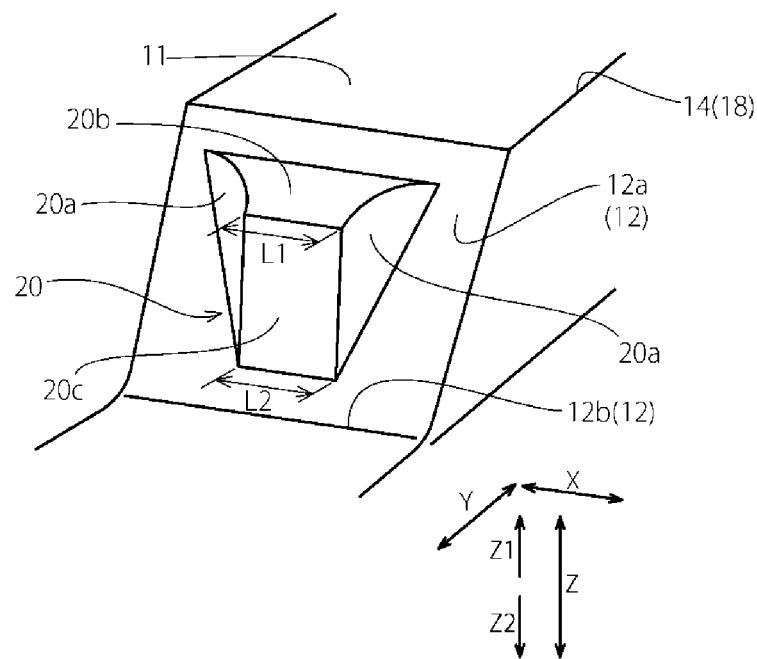
FIG. 9A is a perspective view of a projection formed on a main groove of a pneumatic tire according to a modification 2 of the invention.
Figure 9B:
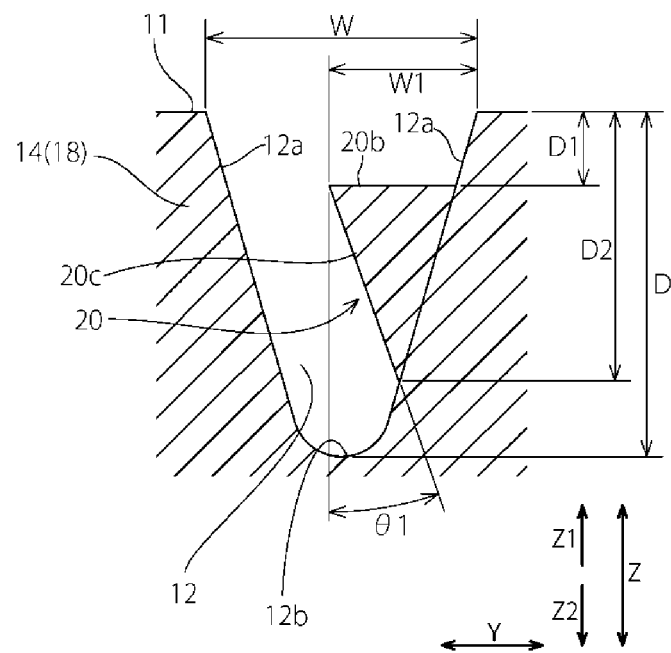
FIG. 9B is a cross-sectional view of the projection formed on the main groove of the pneumatic tire according to the modification 2 of the invention.
Figure 10A:
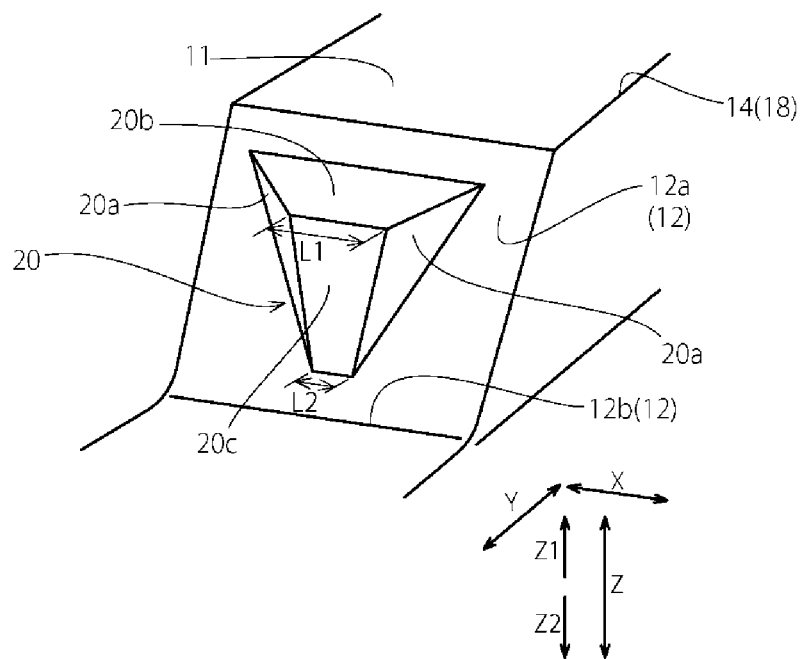
FIG. 10A is a perspective view of a projection formed on a main groove of a pneumatic tire according to a modification 3 of the invention.
Figure 10B:
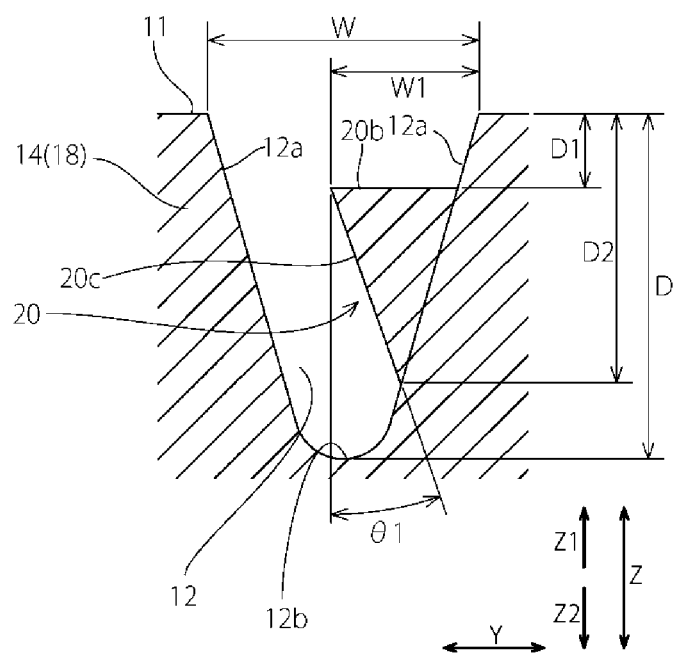
FIG. 10B is a cross-sectional view of the projection formed on the main groove of the pneumatic tire according to the modification 3 of the invention.

In the above-mentioned embodiment, the projections 20 projecting from the groove side walls 12a of the main groove 12 have been explained with respect to the example where the projection 20 has a shape where the projection outer surface 20b is inclined toward the groove bottom 12b side as the projection outer surface 20b extends to the distal end side of the projection 20 in the projecting direction Y when the tire is in a ground non-contact state, the projection side surfaces 20a are indented to the inside of the projection 20 thus forming an arcuate curved shape in cross section, and the length of the projection 20 along the tire circumferential direction X is shortened as the projection 20 extends to the groove bottom 12b of the main groove 12. However, for example, as in the case of a modification 1 shown in FIG. 8, a projection outer surface 20b may be disposed parallel to a ground contact surface 11 when a tire is in a ground non-contact state. Further, as in the case of a modification 2 shown in FIG. 9, a length of a projection front surface 20c along the tire circumferential direction X may be set to a fixed value in the depth direction of the main groove 12. Still further, as in the case of a modification 3 shown in FIG. 10, projection side surfaces 20a may be formed of a flat surface.

According to the invention, various other modifications are conceivable without departing from the gist of the invention although the respective modifications are not enumerated here.

EXAMPLES

Hereinafter, the invention is further explained specifically in conjunction with examples. However, the invention is not limited by these examples.

Pneumatic tires (tire size: 11R22.5 14P. R.) according to examples 1 to 4 and comparison examples 1 to 3 are prepared as specimens. The respective specimen tires are prepared such that the respective specimen tires have the same tire internal structure and the same basic tread pattern, while a shape of projections formed in a main groove is changed between the specimen tires.

To be more specific, the example 1 corresponds to the above-mentioned first embodiment. In the example 1, a projecting amount of the projection 20 from the groove side wall 12a which projects from the groove side wall 12a of the main groove 12 is decreased as the projection 20 extends to the groove bottom 12b of the main groove 12, and the projection 20 terminates at the outside Z1 of the groove bottom 12b in the tire radial direction. A length of the projection portion 20 along the tire circumferential direction X is shortened as the projection 20 extends to a distal end side of the projection 20 in the projecting direction Y. The projection outer surface 20b is inclined toward a groove bottom 12b side as the projection outer surface 20b extends to the distal end side of the projection 20 in the projecting direction Y in a non-ground contact state. The projection side surfaces 20a are indented arcuately inwardly of the projection 20. A length of the projection 20 along the tire circumferential direction X is shortened as the projection 20 extends to the groove bottom 12b of the main groove 12.

The example 2 corresponds to the above-mentioned modification 1 of the invention. Although the example 2 differs from the example 1 with respect to a point that the projection outer surface 20b is disposed parallel to the ground contact surface 11 in a non-ground contact state, the example 2 shares the constitution in common with the example 1 with respect to other constitutions.

The example 3 corresponds to the above-mentioned modification 2 of the invention. Although the example 3 differs from the example 2 with respect to a point that a length of the projection front surface 20c in the tire circumferential direction X is set to a fixed value in the depth direction of the main groove 12, the example 3 shares the constitution in common with the example 2 with respect to other constitutions.

The example 4 corresponds to the above-mentioned modification 3 of the invention. Although the example 4 differs from the example 2 with respect to a point that the projection side surface 20a is formed of a planar surface, the example 4 shares the constitution in common with the example 2 with respect to other constitutions.

Figure 11:
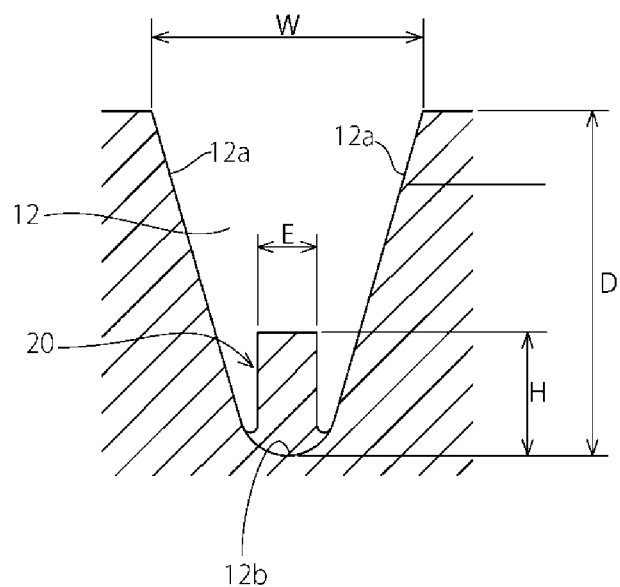
FIG. 11 is a cross-sectional view of a projection formed on a main groove of a pneumatic tire according to a comparison example 1.

In the comparison example 1, as shown in FIG. 11, a projection 20 projects from a groove bottom 12b of a main groove 12 toward the outside Z1 in the tire radial direction, and a projecting amount H of the projection 20 from the groove bottom 12b toward the outside Z1 in the tire radial direction is set to 5 mm. A length E of the projection 20 in the groove width direction of the main groove 12 is set to 2.4 mm.

Figure 12A:
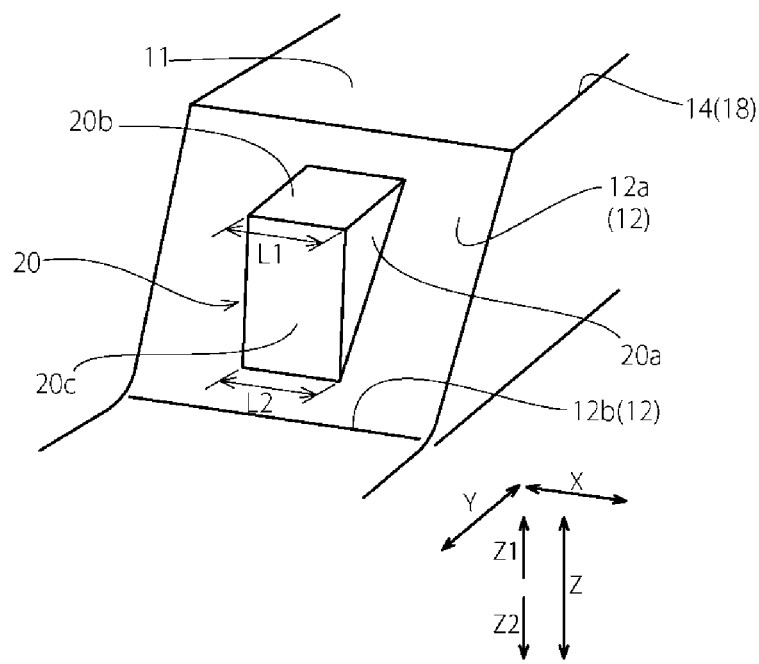
FIG. 12A is a perspective view of a projection formed on a main groove of a pneumatic tire according to a comparison example 2.
Figure 12B:
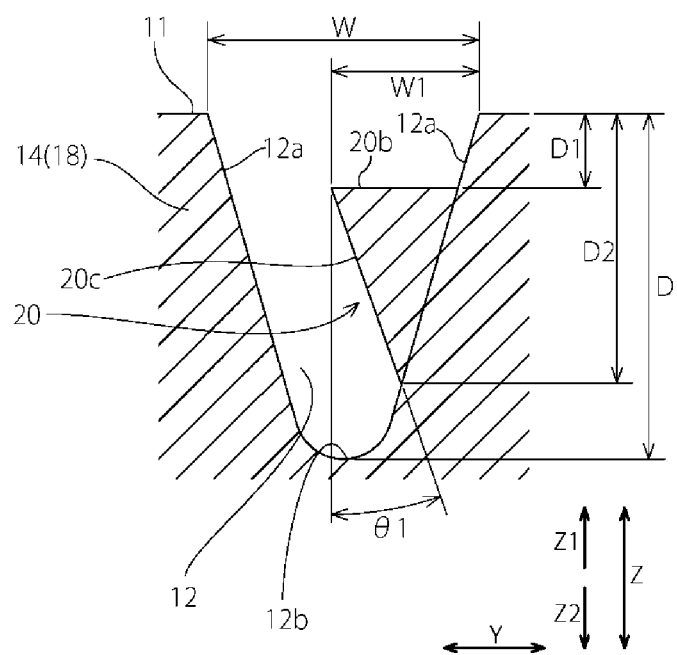
FIG. 12B is a cross-sectional view of the projection formed on the main groove of the pneumatic tire according to the comparison example 2.

In the comparison example 2, as shown in FIG. 12, a projection 20 which projects from a groove side wall 12a of a main groove 12 is configured such that a projecting amount from the groove side wall 12a is decreased as the projection 20 extends to a groove bottom 12b of the main groove 12, and the projection 20 terminates at a position outside Z1 of the groove bottom 12b in the tire radial direction. Further, a length of the projection 20 along the tire circumferential direction X is set to a fixed value in the projecting direction Y of the projection 20.

Figure 13A:
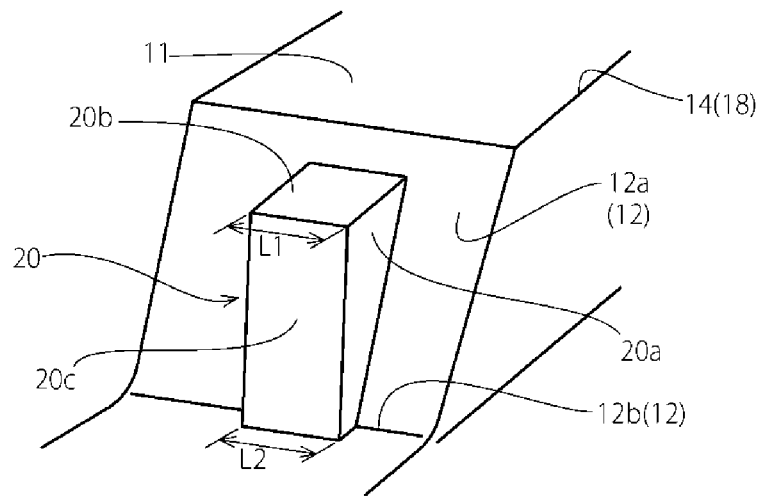
FIG. 13A is a perspective view of a projection formed on a main groove of a pneumatic tire according to a comparison example 3.
Figure 13B:
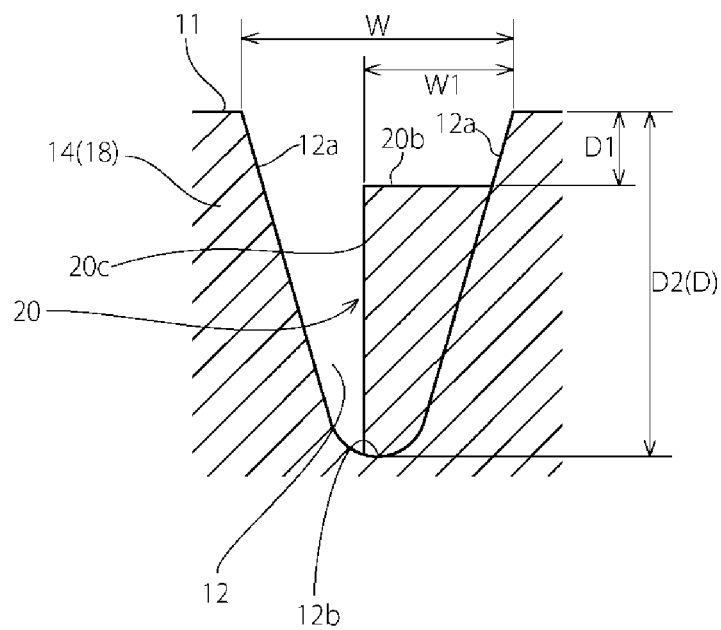
FIG. 13B is a cross-sectional view of the projection formed on the main groove of the pneumatic tire according to the comparison example 3.

In the comparison example 3, as shown in FIG. 13, a projection 20 which projects from a groove side wall 12a of a main groove 12 reaches a groove bottom 12b so that the projection 20 is joined to the groove side wall 12a and the groove bottom 12b, and a length of the projection 20 in the tire circumferential direction X is set to a fixed value in the projecting direction Y of the projection 20.

In the specimen tires of the examples 1 to 4 and the comparison examples 1 to 3, various sizes of the projection 20 formed on the main groove 12 are indicated in Table 1. In Table 1, W indicates a groove width of the main groove 12 on an opening side, D indicates a depth of the main groove 12, W1 indicates a length of the projection 20 from a position where the projection outer surface 20b and the groove side wall 12a are joined to each other to a distal end of the projecting outer surface 20b in the projecting direction Y (projecting amount of the projection 20), L1 indicates a length of a projection front surface 20c along the tire circumferential direction X at the outside Z1 in the tire radial direction, L2 indicates a length of the projecting front surface 20c along the tire circumferential direction X at the inside Z2 in the tire radial direction, D1 indicates a length along the tire radial direction Z from a ground contact surface 11 to the projection outer surface 20b, D2 indicates a length along the tire radial direction from the ground contact surface 11 to the inside Z2 of the projection front surface 20c in the tire radial direction, θ1 indicates an angle of the projection front surface 20c with respect to the tire radial direction Z, and θ2 indicates an angle of the projection outer surface 20b with respect to the projecting direction Y of the projection 20.

Wet performance, pebble biting resistance performance and crack resistance performance are evaluated with respect to the respective pneumatic tires of the examples 1 to 4 and the comparison examples 1 to 3. The following evaluation methods are adopted.

(1) Wet Performance

A specimen tire was assembled to a rim having a size of 22.5×7.50, air was filled into the specimen tire until an internal pressure became 700 KPa, and the specimen tire was mounted on all wheels of a large-sized truck equipped with an ABS device and having a total vehicle weight of 20 t. Thereafter, the truck was made to advance into a water passage having a water depth 10 mm under a load condition of 60% of a maximum loading weight at a speed of 85 Km/h. Braking was started from a point of time that the speed became 80 Km/h. A distance between a braking starting point where braking was started and a point where the speed was decelerated to 20 Km/h was measured. The measurement was performed with respect to a case where a new tire was mounted and a case where a tire which was worn by 50% was mounted respectively. The evaluation result is indicated by an index which is set to 100 with respect to the comparison example 1, and the evaluation result shows that the larger the index, the higher the wet performance becomes.

(2) Pebble Biting Resistance Performance

A specimen tire was assembled to a rim having a size of 22.5×7.50, air was filled into the specimen tire until an internal pressure became 700 KPa, and the specimen tire was mounted on all wheels of a large-sized truck having a total vehicle weight of 20 t, and the number of pebbles entered into the inside of the main groove was measured after the large-sized truck traveled 40000 Km on an ordinary road under a load condition of 90% of a maximum loading weight.

(3) Crack Resistance Performance

A specimen tire was assembled to a rim having a size of 22.5×7.50, air was filled into the specimen tire until an internal pressure became 700 KPa, and the specimen tire was mounted on all wheels of a large-sized truck having a total vehicle weight of 20 t, and the presence or non-presence of cracks generated on groove side walls of a main groove or between a groove bottom and a projection was observed after the large-sized truck traveled 40000 Km on an ordinary road under a load condition of 90% of a maximum loading weight.

TABLE 1

| | example 1 | example 2 | example 3 | example 4 | comparison example 1 | comparison example 2 | comparison example 3 |
|---|---|---|---|---|---|---|---|
| groove width of main groove: W (mm) | 11 | 11 | 11 | 11 | 11 | 11 | 11 |
| depth of main groove: D (mm) | 14 | 14 | 14 | 14 | 14 | 14 | 14 |
| projecting amount of projection: W1 (mm) | 5 | 5 | 5 | 5 | — | 5 | 5 |
| length of projection front surface outside in radial direction: L1 (mm) | 7 | 7 | 7 | 7 | — | 7 | 7 |
| length of projection front surface inside in radial direction: L2 (mm) | 3 | 3 | 7 | 3 | — | 7 | 7 |
| length from ground contact surface to projection outer surface: D1 (mm) | 2 | 2 | 2 | 2 | — | 2 | 2 |
| length from ground contact surface to inside of projection front surface in the radial direction: D2 (mm) | 11 | 11 | 11 | 11 | — | 11 | 14 |
| angle of projection front surface: θ1 (°) | 20 | 20 | 20 | 20 | — | 20 | 0 |
| angle of projection outer surface: θ2 (°) | 2 | 0 | 0 | 0 | — | 0 | 0 |
| wet performance when tire is new | 106 | 103 | 103 | 103 | 100 | 101 | 92 |
| wet performance when tire is worn by 50% | 108 | 108 | 103 | 108 | 100 | 102 | 101 |
| number of pebbles held in main groove (piece) | 3 | 5 | 7 | 7 | 18 | 9 | 11 |
| presence or non-presence of cracks | not present | not present | not present | not present | present | present | present |

The result of the evaluation is shown in Table 1. Compared to the comparison examples 1 to 3, in the examples 1 to 4, the specimen tires exhibited excellent wet performance in both of the case where the specimen tire was new and the case where the tire was worn by 50% and, at the same time, the number of pebbles entered into the inside of the main groove was decreased. Further, in the comparison examples 1 to 3, although cracks occurred at a joining portion between the projection 20 and the groove side wall 12a or the groove bottom 12b of the main groove 12 which constitutes a crack starting point, in the examples 1 to 4, no cracks occurred using a joining portion between the projection 20 and the groove side wall 12a of the main groove 12 which constitutes a starting point so that the occurrence of cracks can be also eliminated.

What is claimed is:

1. A pneumatic tire, comprising:
a tread portion including a main groove extending in a tire circumferential direction and a projection projecting toward the inside of the main groove from a groove side wall of the main groove, wherein
a projecting amount of the projection from the groove side wall is decreased as the projection extends toward a groove bottom of the main groove,
the projection terminates at a position before reaching the groove bottom in a tire radial direction, and the projection has a length at the position where the projection terminates,
a length of the projection along the tire circumferential direction is shortened as the projection extends from a position where the projection joins the groove side wall nearest to a ground contact surface to a distal end side of the projection in a projecting direction,
wherein a length of the projection along the tire circumferential direction is shortened as the projection extends toward the groove bottom of the main groove,
a projection front surface which faces the groove side wall in an opposed manner with the main groove interposed therebetween is a surface which is inclined such that the projection front surface approaches the groove side wall as the projection front surface extends toward the groove bottom,
a length of the projection front surface in a tire radially outward direction is larger than a length of the projection front surface in a tire radially inward direction, and
a length of the projection front surface along the tire circumferential direction is continuously shortened as the projection front surface extends from a side nearest the ground contact surface to the position where the projection terminates.

2. The pneumatic tire according to claim 1, wherein a projecting side surface of the projection facing in the tire circumferential direction is indented inwardly.

3. The pneumatic tire according to claim 2, wherein the projecting side surface is formed into an arcuate curved shape in cross section.

4. The pneumatic tire according to claim 3, wherein a projecting outer surface of the projection facing an outside in a tire radial direction is inclined toward a groove bottom side as the projection extends to a distal end side of the projection in a projecting direction.

5. The pneumatic tire according to claim 3, wherein a projecting outer surface of the projection facing the outside in the tire radial direction is positioned on a groove bottom side with respect to a ground contact surface of the tread portion.

6. The pneumatic tire according to claim 3, wherein the projection is alternately formed on a pair of groove side walls facing each other in an opposed manner in the main groove along the tire circumferential direction.

7. The pneumatic tire according to claim 2, wherein a projecting outer surface of the projection facing an outside in a tire radial direction is inclined toward a groove bottom side as the projection extends to a distal end side of the projection in a projecting direction.

8. The pneumatic tire according to claim 2, wherein a projecting outer surface of the projection facing the outside in the tire radial direction is positioned on a groove bottom side with respect to a ground contact surface of the tread portion.

9. The pneumatic tire according to claim 2, wherein the projection is alternately formed on a pair of groove side walls facing each other in an opposed manner in the main groove along the tire circumferential direction.

10. The pneumatic tire according to claim 1, wherein a projecting outer surface of the projection facing an outside in a tire radial direction is inclined toward a groove bottom side as the projection extends to a distal end side of the projection in a projecting direction.

11. The pneumatic tire according to claim 1, wherein a projecting outer surface of the projection facing the outside in the tire radial direction is positioned on a groove bottom side with respect to a ground contact surface of the tread portion.

12. The pneumatic tire according to claim 1, wherein the projection is alternately formed on a pair of groove side walls facing each other in an opposed manner in the main groove along the tire circumferential direction.

* * * * *